(12) United States Patent
Burkholder et al.

(10) Patent No.: US 11,583,797 B2
(45) Date of Patent: Feb. 21, 2023

(54) DUAL DENSITY NANOFIBER MEDIA

(71) Applicant: NXTNANO, LLC, Lenexa, KS (US)

(72) Inventors: Phillip Ross Burkholder, Tulsa, OK (US); Alan Smithies, Overland Park, KS (US); Andrew Albert Lander McDowell, Bucyrus, KS (US)

(73) Assignee: NxtNano, LLC, Lenexa, KS (US)

( * ) Notice: Subject to any disclaimer, the term of this patent is extended or adjusted under 35 U.S.C. 154(b) by 371 days.

(21) Appl. No.: 16/238,074

(22) Filed: Jan. 2, 2019

(65) Prior Publication Data

US 2019/0201831 A1 Jul. 4, 2019

Related U.S. Application Data

(60) Provisional application No. 62/613,626, filed on Jan. 4, 2018.

(51) Int. Cl.
*B01D 46/54* (2006.01)
*D01D 5/00* (2006.01)
*B01D 39/16* (2006.01)

(52) U.S. Cl.
CPC ....... *B01D 46/546* (2013.01); *B01D 39/1623* (2013.01); *D01D 5/0076* (2013.01); *D01D 5/0092* (2013.01); *B01D 2239/025* (2013.01); *B01D 2239/065* (2013.01); *B01D 2239/0631* (2013.01); *B01D 2239/0654* (2013.01); *B01D 2239/1233* (2013.01)

(58) Field of Classification Search
None
See application file for complete search history.

(56) References Cited

U.S. PATENT DOCUMENTS

| 7,115,150 B2 * | 10/2006 | Johnson | B01D 39/1623 |
| | | | 55/486 |
| 8,404,014 B2 * | 3/2013 | Israel | B01D 46/0023 |
| | | | 55/385.3 |
| 2002/0059868 A1 * | 5/2002 | Gogins | B01D 39/1623 |
| | | | 95/280 |

(Continued)

FOREIGN PATENT DOCUMENTS

| EP | 3029190 | 8/2016 |
| EP | 3056597 | 8/2016 |

OTHER PUBLICATIONS

European Search Report for EP19150258.2; dated May 9, 2019; 6 pages.

*Primary Examiner* — Christopher P Jones
*Assistant Examiner* — Brit E. Anbacht
(74) *Attorney, Agent, or Firm* — Hovey Williams LLP

(57) ABSTRACT

The present invention generally relates to a dual density air filtration media that comprises a plurality of nanofibers layers formed from nanofibers having different fiber diameters. Due to the presence of these multiple nanofiber layers with different nanofiber diameters, the resulting filtration media of the present invention comprises a gradient density. In particular, the present invention uses a novel combination of two or more layers of nanofibers made via an electrospinning process, wherein the nanofiber layers made up from different fiber sizes are strategically applied to a cellulose or synthetic base material or substrate, to thereby maximize the filtration efficiency and dust holding capacity of the resulting filtration media.

18 Claims, 4 Drawing Sheets

(56) References Cited

U.S. PATENT DOCUMENTS

| | | | |
|---|---|---|---|
| 2002/0073667 A1* | 6/2002 | Barris | B01D 46/0001 55/486 |
| 2002/0092423 A1* | 7/2002 | Gillingham | B01D 46/2411 95/287 |
| 2003/0037675 A1* | 2/2003 | Gillingham | D01D 5/0038 95/280 |
| 2003/0106294 A1* | 6/2003 | Chung | B01D 39/086 55/486 |
| 2004/0255783 A1* | 12/2004 | Graham | B01D 46/0068 96/69 |
| 2006/0014460 A1* | 1/2006 | Alexander Isele | B01D 39/1623 442/327 |
| 2007/0102372 A1* | 5/2007 | Ferrer | B01D 39/1623 210/767 |
| 2007/0283808 A1* | 12/2007 | Chung | B01D 46/546 95/285 |
| 2008/0202078 A1* | 8/2008 | Healey | B01D 39/2017 55/341.1 |
| 2009/0199717 A1* | 8/2009 | Green | B01D 39/04 96/12 |
| 2009/0221047 A1* | 9/2009 | Schindler | B01D 39/04 435/160 |
| 2009/0272084 A1* | 11/2009 | Healey | B01D 39/1623 55/487 |
| 2010/0107881 A1* | 5/2010 | Healey | B01D 39/1692 96/11 |
| 2010/0181249 A1* | 7/2010 | Green | B01D 39/1623 210/493.1 |
| 2010/0282682 A1* | 11/2010 | Eaton | B01D 39/1623 210/650 |
| 2011/0064928 A1* | 3/2011 | Bonneh | D04H 3/14 428/212 |
| 2013/0030340 A1* | 1/2013 | Vincent | D04H 1/413 602/42 |
| 2013/0037481 A1* | 2/2013 | Lalouch | C02F 1/001 210/435 |
| 2013/0340613 A1* | 12/2013 | Krupnikov | B01D 53/02 95/90 |
| 2013/0341290 A1* | 12/2013 | Yu | B01D 39/2024 210/767 |
| 2014/0130469 A1* | 5/2014 | Nagy | B01D 39/1607 55/487 |
| 2014/0224727 A1* | 8/2014 | Yu | B01D 39/1623 210/491 |
| 2014/0331626 A1* | 11/2014 | Nagy | B01D 39/2017 55/487 |
| 2015/0375150 A1* | 12/2015 | Sahbaee | B01D 39/163 55/486 |
| 2016/0136553 A1* | 5/2016 | Healey | B01D 39/2017 55/486 |
| 2016/0166953 A1* | 6/2016 | Swaminathan | B01D 39/1623 55/486 |
| 2016/0175752 A1* | 6/2016 | Jaganathan | A41D 13/11 95/273 |
| 2016/0288034 A1* | 10/2016 | Miyauchi | B01D 39/163 |
| 2018/0133632 A1* | 5/2018 | Tripp | B01D 39/1623 |
| 2018/0272258 A1* | 9/2018 | Healey | B01D 39/163 |
| 2019/0201831 A1* | 7/2019 | Burkholder | D01D 5/0092 |
| 2020/0254371 A1* | 8/2020 | Yung | B32B 5/022 |

\* cited by examiner

DUAL DENSITY NANOFIBER MEDIA

RELATED APPLICATIONS

This application claims the priority benefit under 35 U.S.C. § 119(e) of U.S. Provisional Patent Application Ser. No. 62/613,626 entitled "DUAL DENSITY NANOFIBER MEDIA," filed Jan. 4, 2018, the entire disclosure of which is incorporated herein by reference.

BACKGROUND

1. Field of the Invention

The present invention generally relates to filtration media. More particularly, the present invention generally relates to filtration media comprising nanofibers.

2. Description of the Related Art

Filtration media comprising nanofibers are becoming increasingly common in today's market. Generally, such filtration media uses a base substrate to support a single nanofiber layer due to the light basis weight of the nanofibers, which prevents the nanofibers from being self-supporting. For example, a commercial nanofiber coating or layer can have a basis weight ranging from 0.05 to 2.0 g/m$^2$ and may exhibit very little durability or inherent integral strength. Typically, many commercial filtration media incorporating nanofibers use a wet-laid base support formed from either pure cellulose or a cellulose/polyester blend. In such media, the nanofibers can be applied directly to the corrugated or grooved support.

Although recent advancements have been made regarding the use of nanofibers in filtration media, further improvements to nanofiber-based filtration media are still being explored.

SUMMARY

One or more embodiments of the present invention generally pertain to a gradient filtration media. The gradient filtration media can comprise: (a) a filtration media substrate comprising a first influent surface and a first effluent surface; (b) a first nanofiber layer comprising a first nanofiber, wherein the first nanofiber layer comprises a second influent surface and a second effluent surface and the first nanofiber layer at least partially coats the first influent surface of the filtration media substrate; and (c) a second nanofiber layer comprising a second nanofiber, wherein the second nanofiber layer at least partially coats the second influent surface of the first nanofiber layer. In such exemplary embodiments, the first nanofiber can comprise an average diameter of less than 1,000 nm. Furthermore, the second nanofiber can comprise an average diameter that is greater than the average diameter of the first nanofiber.

One or more embodiments of the present invention generally pertain to a gradient filtration media. The gradient filtration media can comprise: (a) a filtration media substrate comprising a first influent surface and a first effluent surface; (b) a first electrospun nanofiber layer comprising a first nanofiber, wherein the electrospun first nanofiber layer comprises a second influent surface and a second effluent surface and the first electrospun nanofiber layer at least partially coats the first influent surface of the filtration media substrate; and (c) a second electrospun nanofiber layer comprising a second nanofiber, wherein the second electrospun nanofiber layer at least partially coats the second influent surface of the first electrospun nanofiber layer. In such exemplary embodiments, the first nanofiber can comprise an average diameter in the range of 50 to 450 nm and the second nanofiber can comprise an average diameter in the range of 500 to 900 nm.

One or more embodiments of the present invention generally pertain to a method for producing a gradient filtration media. Generally, the method comprises: (a) providing a filtration media substrate; (b) electrospinning a first nanofiber layer onto at least a portion of the filtration media substrate, wherein the first nanofiber layer comprises a first nanofiber having an average diameter of less than 1,000 nm; and (c) electrospinning a second nanofiber layer onto at least a portion of the first nanofiber layer, wherein the second nanofiber layer comprises a second nanofiber having an average diameter that is greater than the average diameter of the first nanofiber.

BRIEF DESCRIPTION OF THE FIGURES

Embodiments of the present invention are described herein with reference to the following drawing figures, wherein.

DETAILED DESCRIPTION

Figure 1:
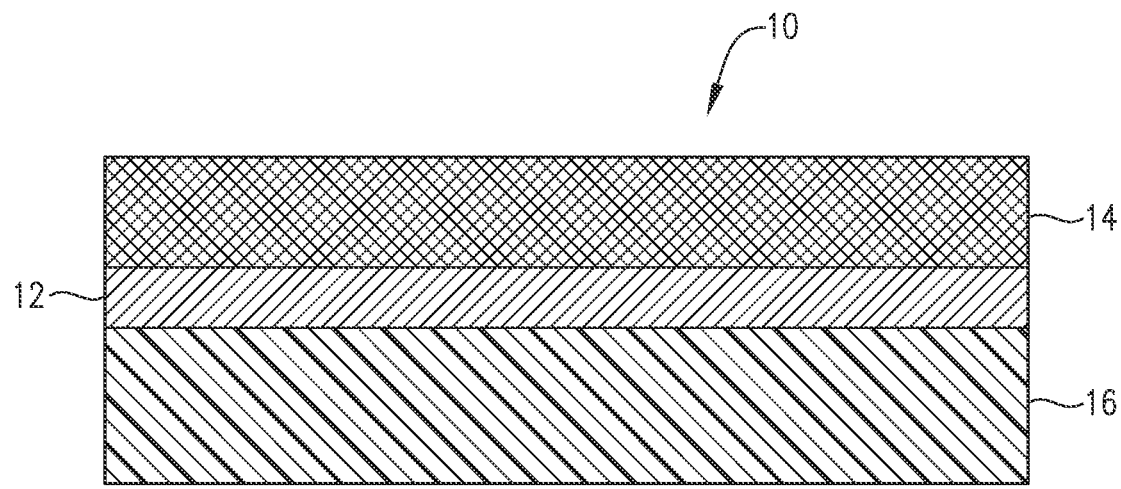
FIG. 1 depicts an exemplary gradient filtration media comprising two separate nanofiber layers.

The present invention generally relates to a dual density air filtration media that comprises a plurality of nanofibers layers formed from nanofibers having different fiber diameters. Due to the presence of these multiple nanofiber layers with different nanofiber diameters, the resulting filtration media of the present invention comprises a gradient density. In particular, the present invention uses a novel combination of two or more layers of nanofibers made via an electrospinning process, wherein the nanofiber layers made up from different fiber sizes are strategically applied to a cellulose or synthetic base material or substrate, to thereby maximize the filtration efficiency and dust holding capacity of the resulting filtration media. Consequently, the enhanced filtration efficiency and dust holding capacity can prolong the operating life of the inventive filter. Furthermore, the use of multiple nanofiber layers can allow the filtration media to function at lower pressure drops, which can result in cost savings.

The composite filtration media of the present invention can be incorporated into a cartridge filter for use in various air filtration applications. Such end use applications include, for example, dust collection, gas turbine inlets, industrial, power generation, HVAC, and automotive applications.

Existing nanofiber-based filtration media typically comprises a single nanofiber coating applied to one side of an existing filter media. Generally, the nanofibers are usually in direct contact with the dirty influent air stream, where the nanofibers either improve the filtration efficiency or improve the operating performance of the final filter. However, the use of multiple nanofibers layers in the present invention allow the nanofiber layers to function as a surface filter and/or as a depth filter, wherein the nanofiber layers can be embedded or sandwiched in-between other filter media or substrates.

Furthermore, unlike conventional single layer nanofiber filter media, in which the single nanofiber layer must capture all of the dust or dirt of all particulate sizes, the gradient filtration media of the present invention can selectively filter the larger and smaller particles as required. More specifically, the multiple nanofiber layers of the present invention allow for the top nanofiber layer to function as a pre-filter to the lower nanofiber layers, which can comprise finer nanofibers. Thus, this prevents the nanofiber layers comprising the finer nanofibers from doing all of the filtration. In other words, the nanofiber layers comprising larger nanofibers can build a primary dust cake, which allows the pressure drop of the filter to build slower over time, thereby prolonging the life of the filter media. Within the filtration industry, this is known as the filter dust holding capacity ("DHC"), which can be measured using the ASHRAE 52.2 test.

In various embodiments, the composite filtration media of the present invention can exhibit a DHC at 4 inches of a pressures drop of at least 50, 55, 60, 65, 70, 75, 76, 77, 78, 79, 80, 81, 82, or 83 grams/ft$^2$ when measured according to the ASHRAE 52.2 test with ISO Fine A2 dust.

In various embodiments, the composite filtration media of the present invention can exhibit a filtration efficiency of at least MERV 11, 12, 13, 14, or 15 as measured according to the ASHRAE 52.2 standard. The MERV rating dictates how much dust the filter will hold when it reaches maximum pressure drop.

In various embodiments, the composite filtration media of the present invention can exhibit superior air filtration performance and may be used for EPA and HEPA filtration. For example, the composite filtration media can exhibit a filter efficiency from E-10 to H-12 as measured using EN1822-2009. Thus, the composite filtration media of the present invention can present a superior alternative to conventional EPA and HEPA filtration media, such as wetlaid glass media and/or electrostatically charged meltblown nonwovens, which exhibit environmental challenges (e.g., glass fibers) and/or loss in filtration performance via moisture exposure (e.g., meltblown media).

An exemplary embodiment of the gradient filtration media of the present invention is depicted in FIG. 1. More specifically, FIG. 1 depicts a gradient filtration media 10 that comprises a first nanofiber layer 12 and a second nanofiber layer 14 coated on the influent surface or effluent surface of a filtration media substrate 16. As shown in FIG. 1, the first nanofiber layer 12 comprises nanofibers that have a smaller average diameter than the nanofibers in the second nanofiber layer 14. Consequently, the combined presence of the first nanofiber layer 12 and the second nanofiber layer 14 can produce a gradient density pore structure in the gradient filtration media 10.

As shown in FIG. 1, the first nanofiber layer 12 and the second nanofiber layer 14 may be positioned on either the influent surface or effluent surface of the filtration media substrate 16 depending on the desired functionality of the nanofiber layers. Thus, in such embodiments, the first nanofiber layer 12 and the second nanofiber layer 14 may at least partially coat the influent surface or effluent surface of the filtration media substrate 16.

In various embodiments, the first nanofiber layer 12 and the second nanofiber layer 14 can be positioned on the influent surface of the filtration media substrate 16. Alternatively, the first nanofiber layer 12 and the second nanofiber layer 14 may be positioned on the effluent surface of the filtration media substrate 16.

Although FIG. 1 only depicts a gradient filtration media 10 comprising a first nanofiber layer 12 and a second nanofiber layer 14, additional nanofiber layers may be at least partially coated on top of these two nanofiber layers and/or on the other side of the filtration media substrate 16 in various embodiments. For instance, at least 1, 2, 3, 4, 5, 6, 7, or 8 additional nanofiber layers may be coated on at least a portion of the second nanofiber layer 14 and/or the uncoated surface of the filtration media substrate 16 depicted in FIG. 1. In certain embodiments, the filtration media substrate may be sandwiched between at least two nanofiber layers on its influent surface and at least two nanofiber layers on its effluent surface.

In embodiments where additional nanofiber layers are applied onto the second nanofiber layer 14, these additional nanofiber layers may comprise nanofibers that have an average diameter that is greater or less than the average diameter of the nanofibers forming the second nanofiber layer 14. In certain embodiments, these additional nanofiber layers positioned on top of the second nanofiber layer 14 may comprise nanofibers that have an average diameter that is greater than the average diameter of the nanofibers forming the second nanofiber layer 14. Thus, this would still form a gradient between the three nanofiber layers, wherein the average diameters of the nanofibers would get smaller and smaller as the nanofiber layers approached the filtration media substrate. In other words, the nanofiber layers positioned closest to the outside of the composite filter would be formed by the nanofibers having the largest average diameter, while the nanofiber layers positioned closest to the filtration media substrate would be formed with the nanofibers having the smallest average diameter. Consequently, this would produce a stack of nanofiber layers with a gradient pore formation. Additionally or alternatively, these gradient stacks of nanofiber layers may be positioned on the influent surface and/or the effluent surface of the filtration media substrate.

Figure 2:
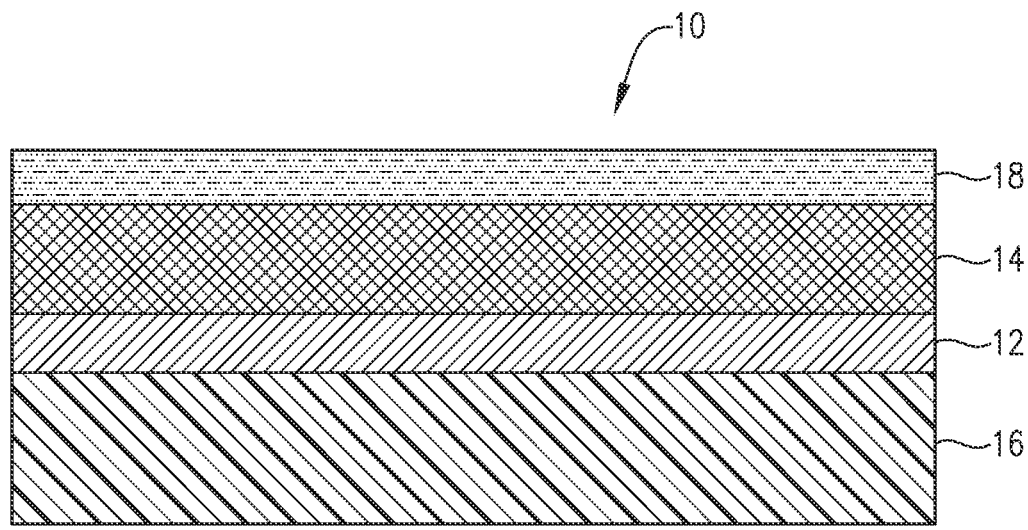
FIG. 2 depicts an exemplary gradient filtration media comprising two separate nanofiber layers sandwiched between a nonwoven pre-filter and a support substrate.

As noted above, the gradient filtration media of the present invention may be used in industrial and commercial heating, ventilation, and air conditioning (HVAC), along in other depth filtration applications. In such applications, it may be preferable to not expose the nanofiber layers on the surface of the filtration media, which would directly expose the nanofiber layers to dust. As depicted in FIG. 2, it may be preferable in such HVAC applications to utilize a coarse pre-filter nonwoven layer 18 that is positioned upstream of the second nanofiber layer 14. Thus, as depicted in FIG. 2, the first nanofiber layer 12 and the second nanofiber layer 14 can be sandwiched between the filtration media substrate 16 and the pre-filter nonwoven 18 for HVAC applications. In such embodiments, the time taken to reach final pressure drop can be longer, which can also extend the life of the filtration media. Furthermore, in such embodiments, the finer filtration media formed by the nanofiber layers can be allowed to more effectively capture finer particulates since it will be protected by the pre-filter nonwoven 18. In other words, in such embodiments, the gradient nanofiber layers (12 and 14) would be behind the pre-filter media 18 with the larger nanofibers 14 upstream of the finer or smaller nanofibers 12. In addition, as noted above, the filtration media substrate 16 can form a stable, supporting base structure that will hold pleat formation and the overall filtration media together. Generally, various assembly methods can be used to build the multi-layer constructs described above including, for example, thermal assembly methods, adhesive assembly methods, sonic lamination methods, or other assembly methods known in the art.

The pre-filter media 18 in the above-referenced embodiments can be a spunbond media, a meltblown media, or other low weight synthetic nonwoven media with high air permeability. Furthermore, the pre-filter media can be electrostatically charged. Alternatively, in certain embodiments, the pre-filter media is not electrostatically charged. In various embodiments, the pre-filter media can comprise a basis weight of at least 5, 10, 15, 20, or 25 gsm and/or less than 100, 90, 80, 70, 60, 50, 40, or 30 gsm.

The nanofibers forming the nanofiber layers of the present invention can be made from various types of thermoplastic polymers such as, for example, polyarylsulfone, fluoropolymers, thermoplastic elastomers, and/or other organic (co) polymer resins. More specific examples of the polymers can include thermoplastic polyurethane (TPU), polyvinylidene fluoride (PVDF), polyethersulfone (PESU), and/or polyacrylonitrile (PAN).

In certain embodiments, the present invention uses thermoplastic polyurethane (TPU) polymers to produce the nanofibers. Generally, the solvent used in the electrospinning step to render the TPU soluble is dimethylformamide. In one or more embodiments, the present invention uses TPU polymers that can be supplied by various suppliers such as BASF, Bayer, and DuPont. For example, the TPU polymers can include those made by Lubrizol under the brand name Estane®.

In various embodiments, the nanofiber layers may be formed from different types of polymers. Thus, in such embodiments, each of the nanofiber layers can be formed from different types of nanofibers. Alternatively, in various embodiments, the nanofiber layers may be formed from the same type of polymer. Therefore, in such embodiments, the nanofiber layers may be formed from the same type of nanofiber. Generally, the selection of polymer types will depend on the application of the filtration media.

In various embodiments, the nanofibers forming the nanofiber layers of the present invention can comprise an average diameter of less than 1,000, 800, 600, 500, 400, 300, or 200 nm. Additionally or alternatively, the nanofibers forming the nanofiber layers of the present invention can comprise an average diameter of at least 1, 10, 50, 100, or 150 nm.

In certain embodiments, the nanofibers forming the first nanofiber layer 12 in FIG. 1 may comprise an average diameter of at least 1, 10, 25, 50, 75, 100, 125, 150, 175, or 200 nm and/or less than 1,000, 900, 800, 700, 600, 500, 400, 350, 300, 275, or 250 nm. Additionally or alternatively, in certain embodiments, the nanofibers forming the second nanofiber layer 14 in FIG. 1 may comprise an average diameter of at least 250, 300, 350, 400, 450, 500, 550, 600, 650, 700, or 750 nm and/or less than 1,000, 950, 900, 850, or 825 nm. Furthermore, in various embodiments, the ratio of the average diameter of the nanofiber forming the second nanofiber layer 14 to the average diameter of the nanofiber forming the first nanofiber layer 12 may be greater than 1:1, 1.2:1, 1.4:1, 1.6:1, 1.8:1, 2:1, 2.5:1, 3:1, 3.5:1, or 4:1.

In various embodiments, the nanofibers forming the nanofiber layers can have an aspect ratio (i.e., length to diameter) of at least 10:1, 50:1, 100:1, 500:1 or 1,000:1.

In various embodiments, the first nanofiber layer 12 can comprise at least 25, 50, 75, 90, 95, or 99 weight percent of at least one nanofiber. In certain embodiments, the first nanofiber layer 12 can comprise, consist essentially of, or consist of at least one nanofiber.

In various embodiments, the second nanofiber layer 14 can comprise at least 25, 50, 75, 90, 95, or 99 weight percent of at least one nanofiber. In certain embodiments, the second nanofiber layer 14 can comprise, consist essentially of, or consist of at least one nanofiber.

In various embodiments, the first nanofiber layer 12 and/or the second nanofiber layer 14 can comprise a basis weight of at least 0.01, 0.05, 0.1, 0.2, 0.5, or 1.0 and/or less than 5.0, 4.0, 3.0, or 2.0 gsm. Furthermore, in the event that additional nanofiber layers are present in the filtration media, such additional nanofiber layers may comprise a basis weight of at least 0.01, 0.05, 0.1, 0.2, 0.5, or 1.0 and/or less than 5.0, 4.0, 3.0, or 2.0 gsm.

The filtration media substrate used in the filtration media can comprise any cellulose-based filtration media or synthetic-based filtration media known in the art. In various embodiments, the synthetic substrate can comprise polyester, polyamide, polyolefin, thermoplastic polyurethane, polyetherimide, polyphenyl ether, polyphenylene sulfide, polysulfone, aramid, polypropylene, or mixtures thereof. In certain embodiments, the synthetic substrate comprises polyester. Furthermore, the filtration media substrate can comprise a wet-laid, dry-laid, spunbond, or needlefelt substrate. In one or more embodiments, the filtration media substrate comprises a basis weight of at least 10, 50, or 70 gsm and/or not more than 500, 400, 300, or 260 gsm.

As discussed above, the nanofibers of the present invention can be formed and applied to the filtration media substrate via an electrospinning process. The electrospinning process may apply the nanofiber layers directly to any type of cellulose or synthetic filtration media substrate. Furthermore, the electrospinning process may apply two or more nanofibers of varying diameters in a single pass through the electrospinning apparatus. Alternatively, the electrospinning process may apply each nanofiber layer individually using multiple passes through the electrospinning apparatus.

Generally, the base polymers in an electrospinning process for producing nanofibers, such as TPU, nylon, or PVDF, must be soluble in a solvent or in an acid in preparation for fiber spinning. For example, nylon nanofibers are spun from a solution of nylon polymer dissolved in formic acid and PVDF nanofibers are spun from PVDF dissolved in dimethyl-acetamide or DMAc. Conventional electrospinning machinery known in the art may be used to carry out the electrospinning step.

Additionally, in various embodiments, additives can be applied to the polymer spinning solution from which the nanofibers are made to enhance certain attributes of the nanofibers. For example, silicone or other polymers could be added to one of the spinning solutions so that the resulting nanofibers would exhibit some level of selective filtration, such as selectively filtering a stream comprising dry dirt and a wet hydrocarbon. Further, additives can be added to the spinning solutions so that the resulting nanofibers can be functionalized to enhance the hydrophobicity, oleophobicity, odor absorption, or mold resistance of the nanofibers.

In various embodiments, the electrospinning of the present invention involves dissolving the desired polymer(s) in a dissolution solvent to form a spinning solution for each of the nanofiber layers. Thus, the spinning solution can comprise, consist essentially of, or consist of any of the above-referenced polymers and a dissolution solvent.

In one or more embodiments, the dissolution solvent comprises formic acid, dimethylacetamide (DMAc), and/or dimethylformamide. In certain embodiments, the solvent comprises dimethylformamide. Generally, the spinning solution comprises a total solids contents of at least 1, 5, or 10 and/or not more than 50, 40, 30, or 20 weight percent as measured by the total weight of the solution.

Next, the aforementioned spinning solution can be electrospun on at least one or more surfaces of a filtration media substrate. In such embodiments, the spinning solution can be coated on at least a portion of a surface of the substrate or on the entire surface of the substrate. More particularly, this step can involve applying the spinning solution onto the filtration media substrate to thereby form the first nanofiber layer on at least a portion of a surface of the substrate. In such embodiments, the nanofiber layer comprises the above-referenced nanofibers. Subsequently, the second nanofiber layer can be electrospun on at least a portion of the surface of the first nanofiber layer.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

A conventional filter comprising a single nanofiber layer applied on a cellulose substrate was compared to an inventive gradient filtration media comprising two nanofiber layers. The substrates in both samples utilized an industrial air filtration media in the form of a wetlaid nonwoven substrate having a basis weight of 122 gsm. Furthermore, the substrate for both samples had a pre-corrugated form. A test area of about 1.0 $ft^2$ was tested for each sample. The DHC and Resistance (WG) of each sample was measured. The control sample was subjected to test conditions at an air flow rate of 3 FPM at a temperature of 75.3° F., a relative humidity of 43.3%, and a barometric pressure of 29.44 inHg. Likewise, the inventive sample was subjected to test conditions at an air flow rate of 3 FPM at a temperature of 75.8° F., a relative humidity of 37.9%, and a barometric pressure of 29.5 inHg. The control sample exhibited an initial resistance of 0.1 WG and a DHC at a 4 inch pressure drop of 76.67 grams/$ft^2$; while the inventive sample exhibited an initial resistance of 0.11 WG and a DHC at a 4 inch pressure drop of 83.33 grams/$ft^2$. Thus, the inventive filtration media exhibited a DHC that was about 10% greater than the conventional nanofiber filtration media. Consequently, this would allow the inventive filtration media to collect about 5 to 10 pounds more dust (dependent on filter size) compared to the conventional filtration media. Furthermore, it is feasible that by optimizing filter construction, this 10% improvement in DHC can be ultimately increased to an improvement of 25 to 30%.

Figure 3:
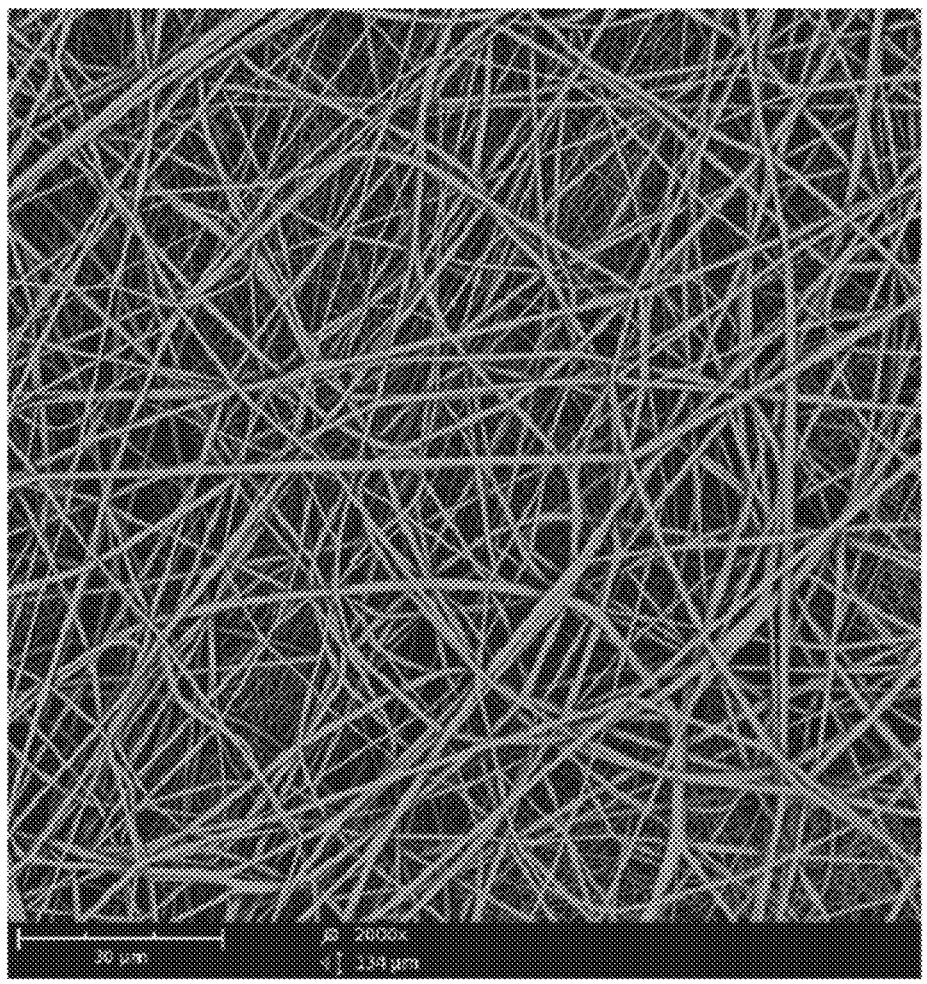
FIG. 3 is a scanning electron micrograph of the gradient filtration media.
Figure 4:
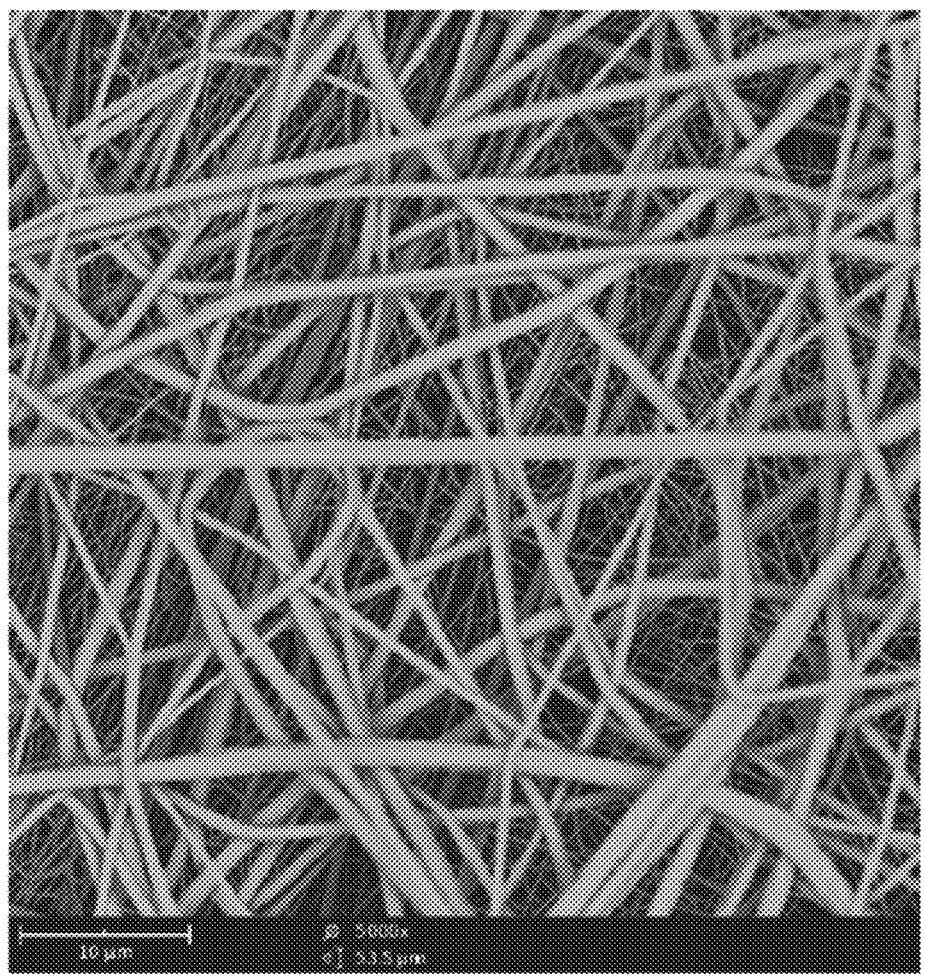
FIG. 4 is a scanning electron micrograph of the gradient filtration media.
Figure 5:
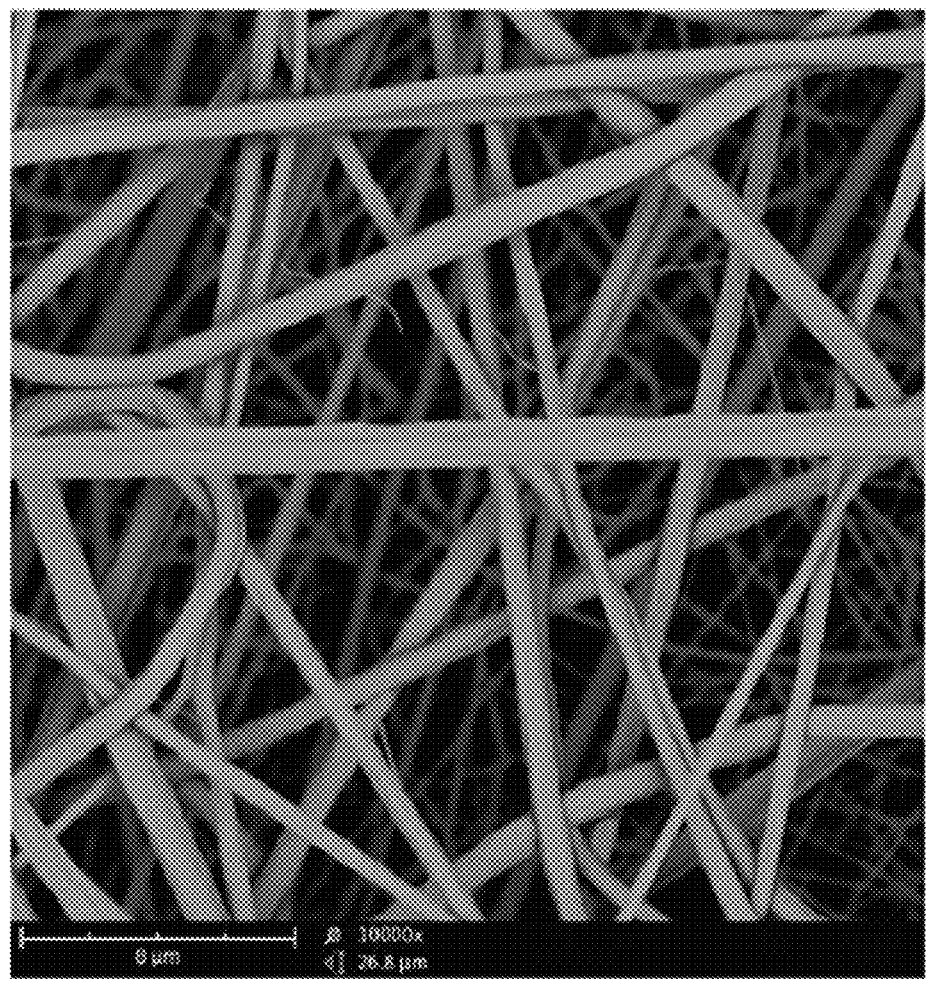
FIG. 5 is a scanning electron micrograph of the gradient filtration media.

FIGS. 3 to 5 depict scanning electron micrographs of the inventive gradient filtration media. In particular, FIGS. 3 to 5 demonstrate how the coarser nanofibers are positioned on top of the finer nanofibers in the composite filtration media, thereby allowing the coarser nanofibers to function as a pre-filter for the finer nanofibers.

Definitions

It should be understood that the following is not intended to be an exclusive list of defined terms. Other definitions may be provided in the foregoing description, such as, for example, when accompanying the use of a defined term in context.

As used herein, "nanofiber" refers to synthetic fibers having an average diameter of less than 1,000 nm.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the terms "first," "second," "third," and the like are used to describe various elements and such elements should not be limited by these terms. These terms are only used to distinguish one element from another and do not necessarily imply a specific order or even a specific element. For example, an element may be regarded as a "first" element in the description and a "second" element in the claims without departing from the scope of the present invention. Consistency is maintained within the description and each independent claim, but such nomenclature is not necessarily intended to be consistent therebetween.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A gradient filtration media, said filtration media comprising:
   (a) a filtration media substrate comprising a first influent surface and a first effluent surface;
   (b) a first nanofiber layer comprising a first nanofiber, wherein said first nanofiber layer comprises a second influent surface and a second effluent surface, wherein said first nanofiber layer at least partially coats said first influent surface of said filtration media substrate, wherein said first nanofiber comprises an average diameter of 1 to 300 nm, wherein said first nanofiber layer is electrospun, and wherein said first nanofiber layer has a basis weight of 0.01 to 2.0 gsm; and
   (c) a second nanofiber layer comprising a second nanofiber, wherein said second nanofiber layer at least partially coats said second influent surface of said first nanofiber layer, wherein said second nanofiber comprises an average diameter that is greater than the average diameter of said first nanofiber, wherein said second nanofiber layer is electrospun, wherein said second nanofiber comprises an average diameter of 700 to 1,000 nm, wherein a ratio of the average diameter of said second nanofiber to the average diameter of the first nanofiber is greater than 3:1, and wherein said second nanofiber layer has a basis weight of 0.01 to 2.0 gsm.

2. The gradient filtration media of claim 1, wherein said first nanofiber layer comprises at least 95 weight percent of said first nanofiber, wherein said second nanofiber layer comprises at least 95 weight percent of said second nanofiber.

3. The gradient filtration media of claim 1, wherein said first nanofiber and/or said second nanofiber comprise a thermoplastic elastomer, a fluoropolymer, a polyarylsulfone, or polyacrylonitrile (PAN).

4. The gradient filtration media of claim 1, wherein said gradient filtration media comprises a third nanofiber layer at least partially coated on said second nanofiber layer, wherein said third nanofiber layer comprises a third nanofiber having a larger average diameter than said second nanofiber, wherein said third nanofiber layer is electrospun and has a basis weight of 0.01 to 2.0 gsm.

5. The gradient filtration media of claim 1, wherein said gradient filtration media consists of:
   (a) said filtration media substrate;
   (b) said first nanofiber layer; and
   (c) said second nanofiber layer comprising a third influent surface.

6. The gradient filtration media of claim 1, wherein said first nanofiber and said second nanofiber are formed from thermoplastic polyurethane (TPU), polyvinylidene fluoride (PVDF), polyethersulfone (PESU), and/or polyacrylonitrile (PAN), and wherein said first nanofiber and said second nanofiber are formed from the same polymer.

7. A gradient filtration media, said filtration media comprising:
   (a) a filtration media substrate comprising a first influent surface and a first effluent surface;
   (b) a first electrospun nanofiber layer comprising a first nanofiber, wherein said first electrospun nanofiber layer comprises a second influent surface and a second effluent surface, wherein said first electrospun nanofiber layer at least partially coats said first influent surface of said filtration media substrate, wherein said first nanofiber comprises an average diameter in the range of 50 to 200 nm, and wherein said first nanofiber layer has a basis weight of 0.01 to 2.0 gsm; and
   (c) a second electrospun nanofiber layer comprising a second nanofiber, wherein said second electrospun nanofiber layer at least partially coats said second influent surface of said first electrospun nanofiber layer, wherein said second nanofiber comprises an average diameter in the range of 750 to 1,000 nm, wherein a ratio of the average diameter of said second nanofiber to the average diameter of the first nanofiber is greater than 4:1, and wherein said second nanofiber layer has a basis weight of 0.01 to 2.0 gsm,
   wherein said gradient filtration media exhibits a filtration efficiency of at least MERV 15.

8. The gradient filtration media of claim 7, wherein said first nanofiber layer comprises at least 95 weight percent of said first nanofiber, wherein said second nanofiber layer comprises at least 95 weight percent of said second nanofiber.

9. The gradient filtration media of claim 8, wherein said first nanofiber and said second nanofiber comprise a thermoplastic elastomer, a fluoropolymer, a polyarylsulfone, or polyacrylonitrile (PAN).

10. The gradient filtration media of claim 8, wherein said first nanofiber and/or said second nanofiber comprise functionalized nanofibers.

11. The gradient filtration media of claim 8, wherein said gradient filtration media comprises a third electrospun nanofiber layer at least partially coated on said second electrospun nanofiber layer, wherein said third electrospun nanofiber layer comprises a third nanofiber having a larger average diameter than said second nanofiber, and wherein said third nanofiber layer has a basis weight of 0.01 to 2.0 gsm.

12. The gradient filtration media of claim 7, wherein said gradient filtration media consists of:
   (a) said filtration media substrate;
   (b) said first electrospun nanofiber layer;
   (c) said second electrospun nanofiber layer comprising a third influent surface.

13. The gradient filtration media of claim 7, wherein said first nanofiber and said second nanofiber are formed from thermoplastic polyurethane (TPU), polyvinylidene fluoride (PVDF), polyethersulfone (PESU), and/or polyacrylonitrile (PAN), and wherein said first nanofiber and said second nanofiber are formed from the same polymer.

14. A method for producing a gradient filtration media, said method comprising:
   (a) providing a filtration media substrate;
   (b) electrospinning a first nanofiber layer onto at least a portion of said filtration media substrate, wherein said first nanofiber layer comprises a first nanofiber having an average diameter of 1 to 300 nm, and wherein said first nanofiber layer has a basis weight of 0.01 to 2.0 gsm; and
   (c) electrospinning a second nanofiber layer onto at least a portion of said first nanofiber layer, wherein said second nanofiber layer comprises a second nanofiber having an average diameter that is greater than the average diameter of said first nanofiber, wherein said second nanofiber comprises an average diameter of 700 to 1,000 nm, wherein a ratio of the average diameter of said second nanofiber to the average diameter of the first nanofiber is greater than 3:1, and wherein said second nanofiber layer has a basis weight of 0.01 to 2.0 gsm.

15. The method of claim 14, wherein said electrospinning of step (a) and said electrospinning of step (b) are carried out via separate passes with an electrospinning machine.

16. The method of claim 14, wherein said electrospinning of step (a) and said electrospinning of step (b) are carried out in a single pass with an electrospinning machine.

17. The method of claim 14, wherein the ratio of the average diameter of said second nanofiber to the average diameter of the first nanofiber is greater than 1.2:1.

18. The method of claim 14, wherein said first nanofiber and said second nanofiber comprise a thermoplastic elastomer, a fluoropolymer, a polyarylsulfone, or polyacrylonitrile (PAN).

\* \* \* \* \*